(12) United States Patent
Ford et al.

(10) Patent No.: US 6,772,928 B2
(45) Date of Patent: Aug. 10, 2004

(54) MULTIPURPOSE ACTIVITY FRAME FOR USE ON ARTICULATING ROOF RACK SYSTEM

(75) Inventors: Michael Ford, Ypsilanti, MI (US); Noah Barlow Mass, Ann Arbor, MI (US); Noel Ranka, Canton, MI (US); Travis Steven Garland, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 10/063,455

(22) Filed: Apr. 24, 2002

(65) Prior Publication Data
US 2003/0201288 A1 Oct. 30, 2003

(51) Int. Cl.[7] .............................. B60R 9/042; B60R 9/06
(52) U.S. Cl. ........................ 224/497; 224/310; 224/319; 224/504; 280/769; 414/462
(58) Field of Search .................................. 224/310, 319, 224/325, 326, 492, 497, 499, 504; 414/462; 280/769

(56) References Cited

U.S. PATENT DOCUMENTS

| 1,743,220 | A | | 1/1930 | Johnson |
|---|---|---|---|---|
| 1,779,662 | A | | 10/1930 | Cleland |
| 2,204,824 | A | | 6/1940 | Rock |
| 3,777,922 | A | * | 12/1973 | Kirchmeyer ................ 414/462 |
| 5,360,150 | A | * | 11/1994 | Praz ........................... 224/310 |
| 5,435,472 | A | * | 7/1995 | Allen et al. ................. 224/497 |
| 5,544,796 | A | * | 8/1996 | Dubach ...................... 224/326 |
| 5,560,525 | A | * | 10/1996 | Grohmann et al. ......... 224/325 |
| 5,676,292 | A | | 10/1997 | Miller |
| 5,690,259 | A | * | 11/1997 | Montani ..................... 224/310 |
| 5,826,769 | A | | 10/1998 | Allen et al. |
| 5,947,357 | A | | 9/1999 | Surkin |
| 5,971,241 | A | * | 10/1999 | Allen et al. ................. 224/497 |
| 6,308,874 | B1 | * | 10/2001 | Kim et al. ................... 224/310 |

* cited by examiner

Primary Examiner—Gary E. Elkins
(74) Attorney, Agent, or Firm—Gigette M. Bejin

(57) ABSTRACT

The present invention provides a multipurpose activity frame for a vehicle articulating roof rack system including a vehicle articulating roof rack system having a selectively removable portion operable between a stowed roof mounted position and a slideably and pivotally repositionable back end mounted position, a stationary top portion received by the selectively removable portion of the articulating roof rack system, and a rotatable bottom portion operable between a stowed vertical position and an open horizontal position received by the stationary top portion.

18 Claims, 3 Drawing Sheets

MULTIPURPOSE ACTIVITY FRAME FOR USE ON ARTICULATING ROOF RACK SYSTEM

BACKGROUND OF INVENTION

1. Field of the Invention

The present invention relates to frames, and more specifically, to a multipurpose activity frame for a vehicle articulating roof rack system.

2. Background of the Invention

An articulating roof rack system provides a new level of utility not seen in current roof rack systems. The system is operatively deployed upon a vehicle and is selectively movable to allow a user to easily and quickly load and unload items to and from the assembly. As such, a portion of the roof rack assembly is selectively removable from the roof, thereby allowing the user to access the assembly from ground level.

To allow for the selectively removable portion of the roof rack assembly to be repositioned, the system provides for support members in combination with cross members to be slideably and pivotally repositionable upon the back end of the vehicle such that the assembly is in a back end mounted position, resulting in the assembly being substantially parallel with the back end of the vehicle. In this back end position, the user can easily load and unload items from ground level without the use of a ladder or the like.

It is in this back end mounted position that the multipurpose activity frame is intended to be used in conjunction with the articulating roof rack system. While the system provides for easy operator loading and unloading and access from ground level, its purpose is to securely store and hold items that are not currently in use. In such vehicles where the rack system would be used, typically sport utility vehicles and the like, there is a need for increased utility of external vehicle components. An operator may desire, for example, to sit or to store items that are currently in use on an external vehicle device.

It is therefore desired to have a multipurpose activity frame for a vehicle articulating roof rack system thereby providing means to accommodate different items in use during different outdoor activities such as chairs for tailgating, storage bins or coolers for camping, or a grill for picnics.

SUMMARY OF INVENTION

It is an object of the present invention to provide a multipurpose activity frame for a vehicle articulating roof rack system that overcomes the disadvantages of the prior art.

Accordingly, the present invention advantageously provides a multipurpose activity frame comprising a vehicle articulating roof rack system having a selectively removable portion operable between a stowed roof mounted position and a slideably and pivotally repositionable back end mounted position, a stationary top portion received by the selectively removable portion of the articulating roof rack system, and a rotatable bottom portion operable between a stowed vertical position and an open horizontal position received by the stationary top portion.

It is a feature of the present invention that the multipurpose activity frame for a vehicle articulating roof rack system folds out from a locked position to provide an L-shaped frame which can then be compressed or extended to the desired size.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
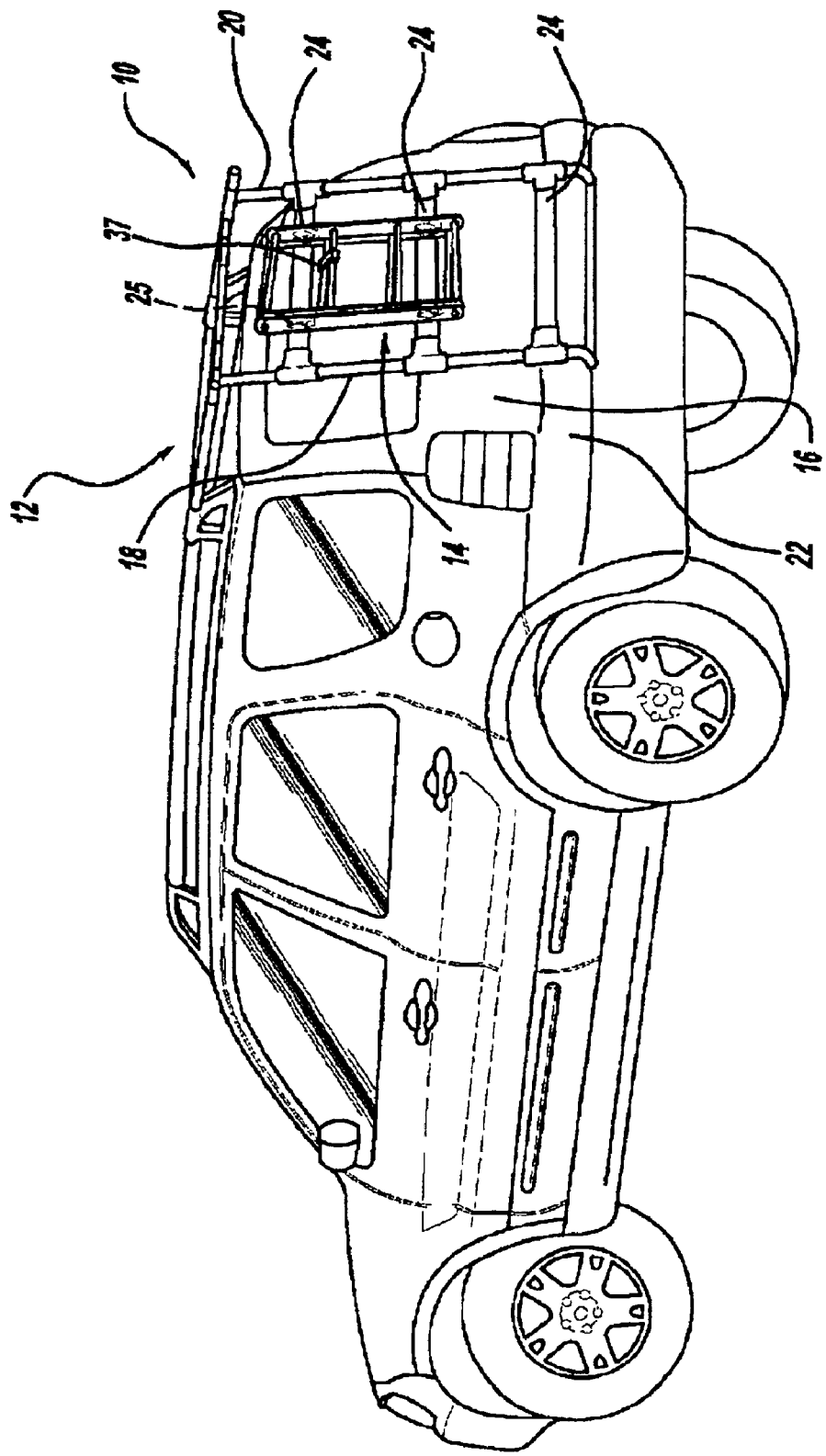
FIG. 1 is a perspective view of a multipurpose activity frame on an articulating roof rack system of a vehicle according to the present invention.

Referring to FIG. 1, a vehicle 10 having an articulating roof rack system 12 on which there is a multipurpose activity frame 14 is shown. Although not limited to such, the vehicle 10 which has such a rack system 12 is typically a sport utility vehicle or the like. The vehicle 10 has a back end 16 upon which the system 12 is slideably and pivotally repositionable.

The rack system 12 has left and right support members, 18 and 20 respectively, that are slideably and pivotally repositionable upon the back end 16 of the vehicle 10. The left and right support members 18 and 20 are tubular shaped and extend substantially the height of the back end 16 of the vehicle 10 when in this back end mounted position, excluding a rear bumper 22.

The roof rack system 12 also has a plurality of tubular shaped cross members 24 each received by both the left and right support members 18 and 20 such that they are perpendicular to said support members 18 and 20. The plurality of cross members 24 are a predetermined distance apart. The left and right support members 18 and 20 in combination with the cross members 24 form the roof rack system 12 which, in its entirety, extends a predetermined width of the back end 16 of the vehicle 10 when in this back end mounted position.

The multipurpose activity frame 14 is removably attached to the system 12 by using crossbar mounts 25, such as what are currently used for bicycle and cargo carriers, which attach to the cross members 24 of the system 12. Here in FIG. 1, the multipurpose activity frame 14 is in a stowed vertical locked position. A feature of the multipurpose activity frame 14 is that when not in use, it can be locked in this stowed position, or it can be removed from the vehicle 10 altogether.

Figure 2:
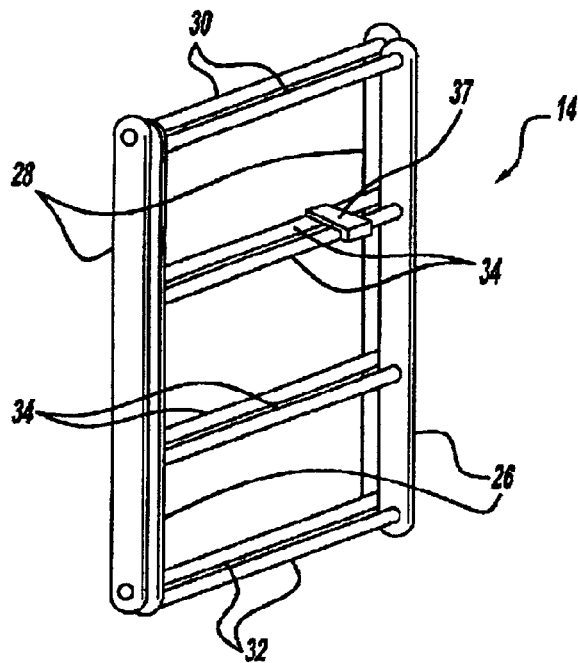
FIG. 2 is a perspective view of a multipurpose activity frame in a stowed vertical locked position according to the present invention.

A closer look at the multipurpose activity frame 14 is seen in FIG. 2. Here, the multipurpose activity frame 14 is in the stowed locked vertical position. The multipurpose activity frame 14 has two pairs of side members, a stationary top pair of side members 26 and a rotatable bottom pair of side members 28 pivotally operable between a stowed vertical position and articulated downward 90 degrees to an open horizontal platform position. The side members 26 and 28 are tubular shaped. The side members 26 and 28 extend a predetermined length and are a predetermined distance apart such that when in this stowed position, the pairs of side members 26 and 28 are aligned and are parallel with one another.

Each pair of side members 26 and 28 has a tubular shaped top member 30 and a tubular shaped bottom member 32. The top and bottom members 30 and 32 of each pair of side members 26 and 28 attach to the side members 26 and 28 such that they are perpendicular with said side members 26 and 28. As such, when the multipurpose activity frame 14 is in this stowed position, both top members 30 and both bottom members 32 are aligned and are parallel with one another.

Each pair of side members 26 and 28 also has a plurality of tubular shaped middle members 34. The middle members 34 are a predetermined distance apart and are attached to the side members 26 and 28 such that they are perpendicular with said side members 26 and 28 and are parallel to the top and bottom members 30 and 32. As such, when the multipurpose activity frame 14 is in this stowed position, the plurality of middle members 34 of each pair of side members 26 and 28 are aligned and are parallel with one another.

Figure 3:
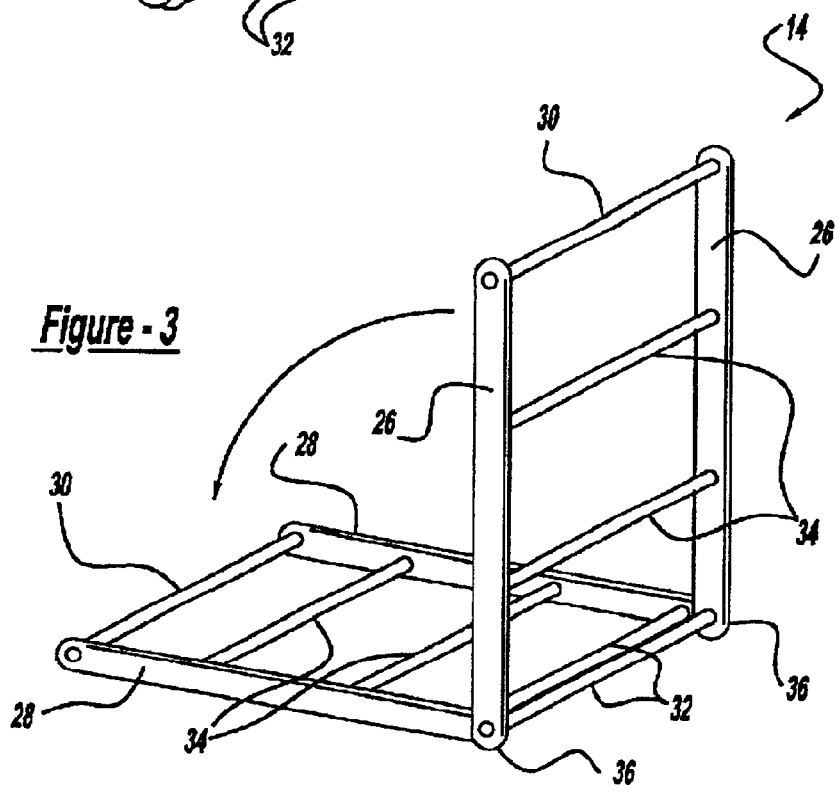
FIG. 3 is a perspective view of a multipurpose activity frame in an open horizontal position according to the present invention.

FIG. 3 shows the multipurpose activity frame 14 in an open horizontal position as it would be when in use while attached to the rack system 12. In this position, the stationary top side members 26 are parallel with the back end 16 of the vehicle 10. The bottom side members 28 and their corresponding top member 30 and middle members 34 are rotated downward 90 degrees through hinge points 36 at the bottom members 32 such that the bottom side members 28 are perpendicular with the top side members 26 and the back end 16 of the vehicle 10.

In such a position the bottom side members 28 and their corresponding top member 30, bottom member 32, and middle members 34 serve to accommodate storage bins, coolers, grills, and the like, and can serve as a seat much like a stadium chair during various outdoor activities. When not in use, the bottom side members 28 and their corresponding top member 30 and middle members 34 are rotated upward 90 degrees to the stowed vertical position and locked via a locking mechanism 37.

Figure 4:
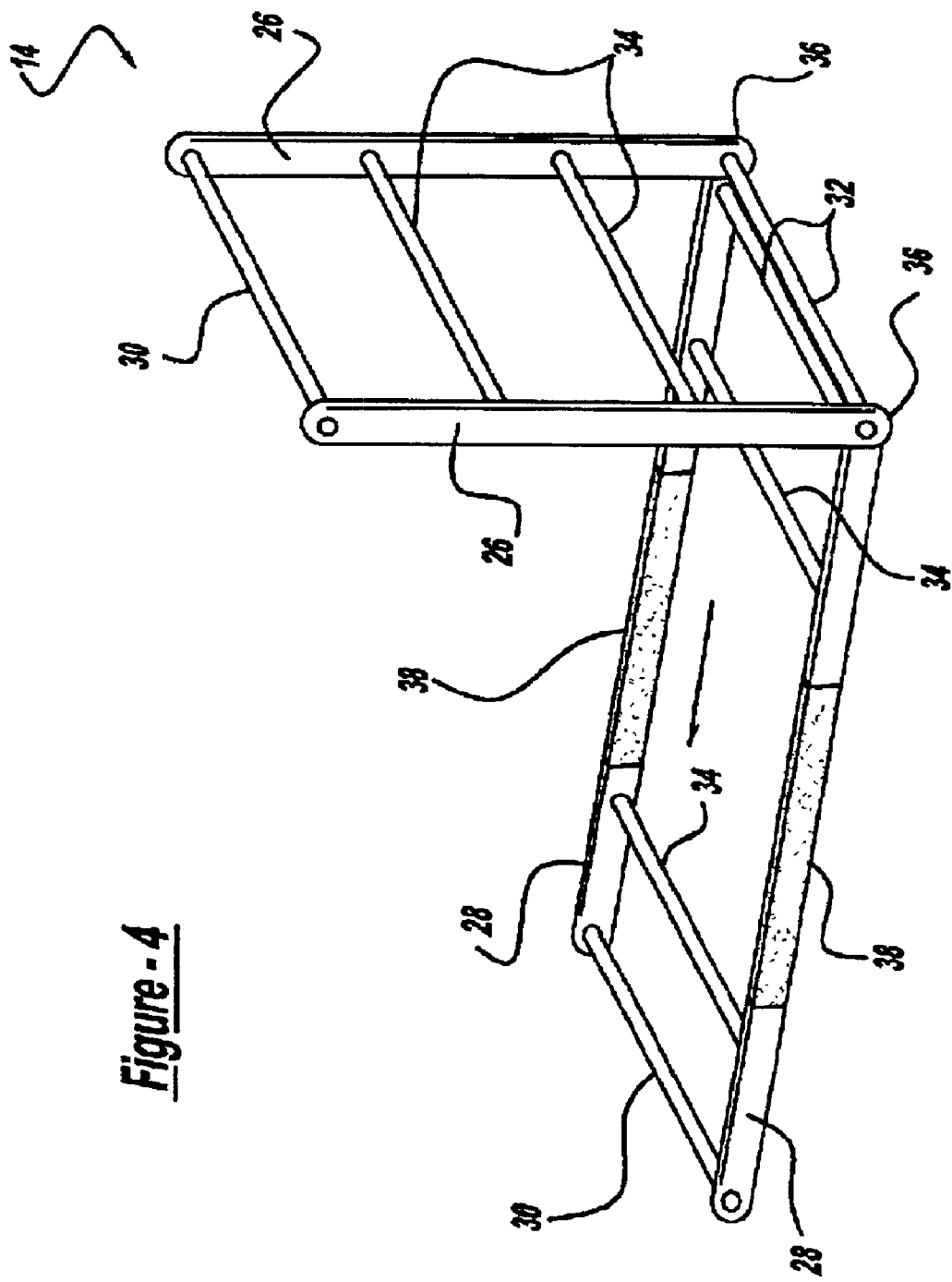
FIG. 4 is a perspective view of a multipurpose activity frame in an open horizontal extended position according to the present invention.

A feature of the multipurpose activity frame 14 is shown in FIG. 4. As seen here, in addition to the multipurpose activity frame 14 being in a usable open position, it is also in a telescopically extended position. As such, it can be extended to a configuration that can accommodate a variety of different sized items. To accomplish this, the bottom side members 28 each have extension locks 38, that function much like mop handle locks. The extension locks 38 are a predetermined distance between the top member 30 and the bottom member 32 of the bottom side members 28. As such, the middle members 34 of the bottom side members 28 can be placed closely together for smaller items as seen in FIG. 3, or further apart for larger items as seen in FIG. 4.

When the operator is through with this extended position, the extension locks 38 are disengaged, allowing the top member 30 and the middle members 34 of the bottom side members 28 to be returned back to their original positions. The bottom side members 28 and corresponding top member 30 and middle members 34 can then be rotated through the hinge points 36 upward 90 degrees into the stowed vertical position.

While only one embodiment of the multipurpose activity frame of the present invention has been described, others may be possible without departing from the scope of the following claims.

What is claimed is:

1. A vehicle articulating roof rack system having a multipurpose activity frame, comprising:
    said multipurpose activity frame including a selectively movable portion of the articulating roof rack system operable between a stowed roof mounted position and a slideably and pivotally repositionable back end mounted position;
    a stationary top portion received by the selectively movable portion; and
    a rotatable bottom portion operable between a stowed vertical position and an open horizontal position received by the stationary top portion.

2. The vehicle articulating roof rack system having a multipurpose activity frame as defined in claim 1, wherein the selectively movable portion of the articulating roof rack system has two support members a predetermined length and a plurality of cross members a predetermined length and a predetermined distance apart.

3. The vehicle articulating roof rack system having a multipurpose activity frame as defined in claim 1, wherein the stationary top portion is detachably received by the selectively movable portion of the articulating roof rack system.

4. The vehicle articulating roof rack system having a multipurpose activity frame as defined in claim 1, wherein the stationary top portion has a pair of side members a predetermined length and a plurality of middle members a predetermined length and a predetermined distance apart.

5. The vehicle articulating roof rack system having a multipurpose activity frame as defined in claim 1, wherein the rotatable bottom portion has a pair of side members a predetermined length and a plurality of middle members a predetermined length and a predetermined distance apart.

6. The vehicle articulating roof rack system having a multipurpose activity frame as defined in claim 1, wherein when the bottom portion is in a stowed vertical position it can be locked in place via a locking mechanism.

7. The vehicle articulating roof rack system having a multipurpose activity frame as defined in claim 1, wherein when the bottom portion is in an open horizontal position it is extendable and retractable via use of extension locks.

8. A vehicle articulating roof rack system having a multipurpose activity frame, comprising:
    said multipurpose activity frame including a selectively movable portion of the articulating roof rack system operable between a stowed roof mounted position and a slideably and pivotally repositionable back end mounted position;
    a stationary top portion detachably received by the selectively movable portion; and
    a rotatable bottom portion operable between a stowed vertical position and an open horizontal position received by the stationary top portion.

9. The vehicle articulating roof rack system having a multipurpose activity frame as defined in claim 8, wherein the selectively movable portion of the articulating roof rack system has two support members a predetermined length and a plurality of cross members a predetermined length and a predetermined distance apart.

10. The vehicle articulating roof rack system having a multipurpose activity frame as defined in claim 8, wherein the stationary top portion has a pair of side members a predetermined length and a plurality of middle members a predetermined length and a predetermined distance apart.

11. The vehicle articulating roof rack system having a multipurpose activity frame as defined in claim 8, wherein the rotatable bottom portion has a pair of side members a predetermined length and a plurality of middle members a predetermined length and a predetermined distance apart.

12. The vehicle articulating roof rack system having a multipurpose activity frame as defined in claim 8, wherein when the bottom portion is in a stowed vertical position it can be locked in place via a locking mechanism.

13. The vehicle articulating roof rack system having a multipurpose activity frame as defined in claim 8, wherein when the bottom portion is in an open horizontal position it is extendable and retractable via use of extension locks.

14. A vehicle articulating roof rack system having a multipurpose activity frame, comprising:

said multipurpose activity frame including a selectively movable portion of the articulating roof rack system operable between a stowed roof mounted position and a slideably and pivotally repositionable back end mounted position;

a stationary top portion detachably received by the selectively movable portion;

a rotatable bottom portion operable between a stowed vertical position and an open horizontal position received by the stationary top portion; and wherein when in the open horizontal position, the bottom portion is extendable and retractable thereby providing a platform of varying size.

15. The vehicle articulating roof rack system having a multipurpose activity frame as defined in claim 14, wherein the selectively movable portion of the articulating roof rack system has two support members a predetermined length and a plurality of cross members a predetermined length and a predetermined distance apart.

16. The vehicle articulating roof rack system having a multipurpose activity frame as defined in claim 14, wherein the stationary top portion has a pair of side members a predetermined length and a plurality of middle members a predetermined length and a predetermined distance apart.

17. The vehicle articulating roof rack system having a multipurpose activity frame as defined in claim 14, wherein the rotatable bottom portion has a pair of side members a predetermined length and a plurality of middle members a predetermined length and a predetermined distance apart.

18. The vehicle articulating roof rack system having a multipurpose activity frame as defined in claim 14, wherein when the bottom portion is in a stowed vertical position it can be locked in place via a locking mechanism.

* * * * *